United States Patent [19]

Morse

[11] 3,916,321

[45] Oct. 28, 1975

[54] NOISE SUPPRESSION CIRCUIT

[75] Inventor: Peter Lee Morse, LeRoy, N.Y.

[73] Assignee: GTE Sylvania Incorporated, Stamford, Conn.

[22] Filed: Jan. 20, 1975

[21] Appl. No.: 542,183

[52] U.S. Cl. .................................. 325/478; 325/480

[51] Int. Cl.² ............................................ H04B 1/10

[58] Field of Search ........... 325/323, 324, 319, 348, 325/402–405, 410, 473, 474, 477, 478, 480

[56] References Cited

UNITED STATES PATENTS 3,199,031 8/1965 Harris et al. ........................ 325/478

*Primary Examiner*—Albert J. Mayer
*Attorney, Agent, or Firm*—Norman J. O'Malley; Thomas H. Buffton; Robert T. Orner

[57] ABSTRACT

A noise suppression circuit for a signal receiver having at least one audio signal channel and a switchable potential source includes a delay circuit for effecting delay in potential application and continued muting of the audio signal channel when the switchable potential source is energized, a first time-constant circuit to effect rapid potential discharge and muting of the audio signal channel when the switchable potential source is de-energized, and a second time-constant circuit and a functional switch to effect muting of a signal channel upon activation of the functional switch or switches.

14 Claims, 3 Drawing Figures

NOISE SUPPRESSION CIRCUIT

BACKGROUND OF THE INVENTION

Generally, signal receivers having one or more audio signal channels are troubled with undesired noise in the form of clicks and pops whenever the apparatus is activated, de-activated, or a change in functions is desired. Moreover, such undesired noise is particularly evident in apparatus with multiple audio signal channels and a multiplicity of switchable functions such as AM, FM, Phono, etc.

In an attempt to eliminate or at least reduce the above-mentioned undesirable noise, one known form of apparatus includes a relay in the loudspeaker circuitry associated with the audio signal channel. Therein, the relay served to inhibit undesired noise whenever the receiver was either energized or de-energized.

Although the above-mentioned technique served to enhance the signal receiver, it did leave much to be desired. For example, relays are relatively expensive and subject to wear, deterioration, and inconsistency of result. Moreover, the above-mentioned apparatus failed to take into account undesired noise encountered when functional or switching changes in the apparatus are employed.

OBJECTS AND SUMMARY OF THE INVENTION

An object of the invention is to provide a signal receiver having enhanced noise suppression. Another object of the invention is to improve the noise suppression capability of a signal receiver. Still another object of the invention is to provide apparatus for enhancing noise suppression in a signal receiver during energization, de-energization, and functional switching of the receiver. A further object of the invention is to control muting of a sound channel in a signal receiver whenever changes in energization or functional switching of the signal receiver occur.

These and other objects, advantages and capabilities are achieved in one aspect of the invention by noise suppression circuitry having a triggering means coupling a switchable potential source to a first time-constant circuit and responsive to a delay in applied potential whereby muting of a signal channel is effected upon activation of the switchable potential source. Also, a second time-constant circuit shunting the first time-constant circuit includes a capacitor shunted by a functional switch whereby any activation of the functional switch causes muting of the signal receiver.

PREFERRED EMBODIMENTS OF THE INVENTION

For a better understanding of the present invention, together with other and further objects, advantages and capabilities thereof, reference is made to the following disclosure and appended claims in conjunction with the accompanying drawings.

Figure 1:
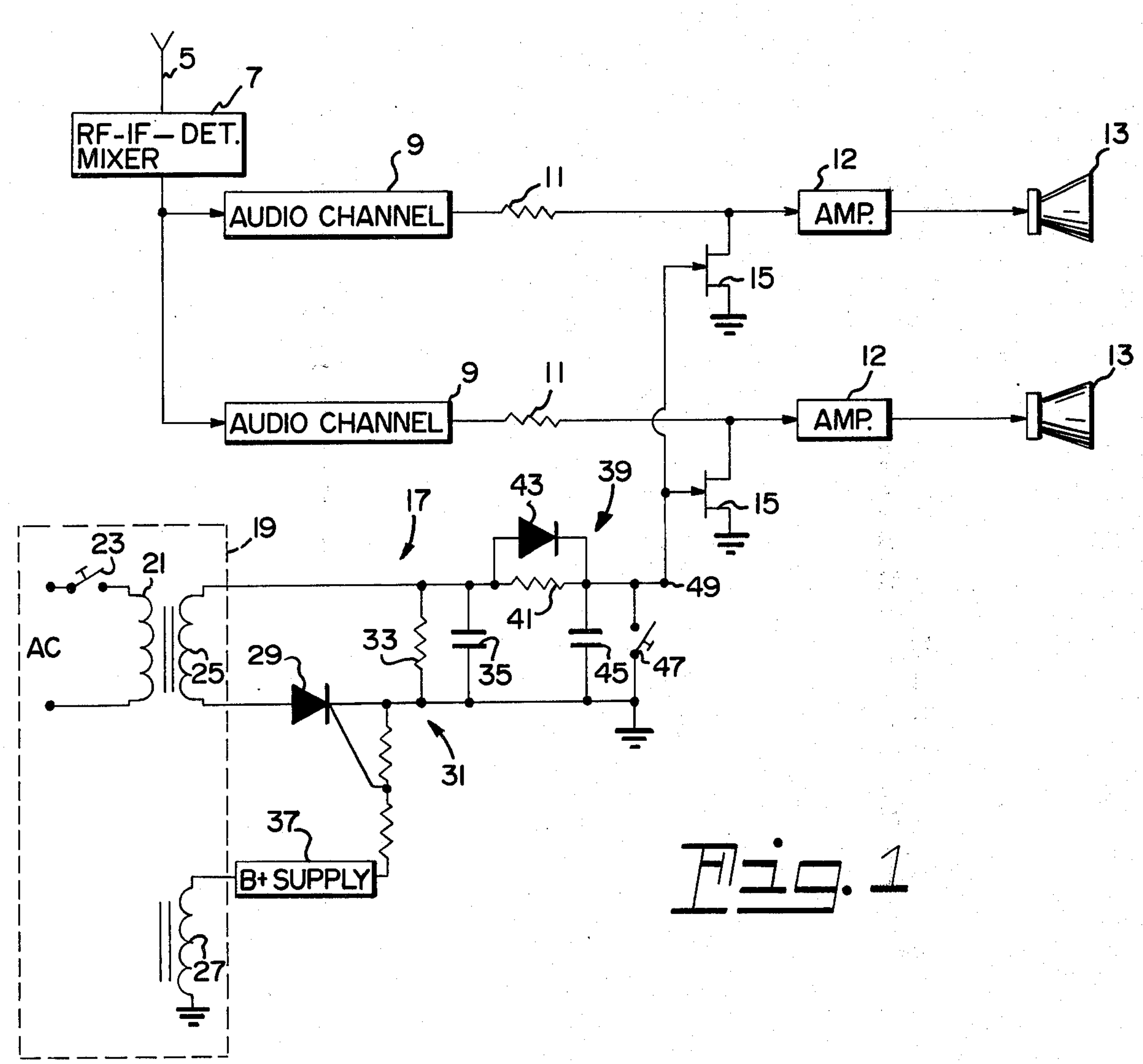
FIG. 1 illustrates, in block and schematic form, a preferred embodiment of the invention as employed in an audio signal receiver.

Referring to FIG. 1 of the drawings, a signal receiver includes the usual antenna 5 coupled to RF-IF amplifier, detector, and mixer stages 7 to provide an audio signal. This audio signal is applied to one or more audio signal channels 9 each including an impedance 11 coupled via an amplifier 12 to a loudspeaker 13. Moreover, each one of the signal channels 9 is coupled by an impedance 11 to a muting means 15, an FET in this instance, to circuit ground.

Coupled to and controlling each one of the muting means 15 is a noise suppression circuit 17. The noise suppression circuit 17 has a potential source 19 which includes a primary winding 21 coupled by an energizing switch 23 to an AC potential source. Also, first and second secondary windings, 25 and 27 respectively, are inductively coupled to the primary winding 21.

The first secondary winding 25 is coupled by way of a first switching means 29, an SCR in this instance, to a first time-constant circuit 31 which includes a parallel connected resistor 33 and capacitor 35. The second secondary winding 27 is connected via a delay means 37, a DC power supply, to the control electrode of the SCR or first switching means 29.

A second time-constant circuit 39 includes a resistor 41 shunted by a diode 43 and in series connection with a capacitor 45. This second time-constant circuit 39 is shunted across the first time-constant circuit 31. Also, the capacitor 45 of the second time-constant circuit 39 is shunted by a functional switching means 47 and both the capacitor 45 and function switching means 47 are connected to a junction 49 which is, in turn, connected to the control electrode of the muting means 15 in one or more of the audio signal channels 9.

As to operation, the junction 49 and control electrodes of the FET muting means 15 are normally at ground potential whenever the circuitry is in the non-operative condition. At such times, the FET muting means 15 act as a low impedance to circuit ground whereby any signal in the audio signal channels 9 is attenuated by means of impedance 11 and FET 15.

When the energizing switch 23 is activated or closed, a potential is applied to the SCR or first switching means 29. At the same time, a potential available at the second secondary winding 27 is applied to the delay means or B+ supply 37. Therein, a delayed potential is derived and applied to the SCR or first switching means 29 to effect conductivity therethrough.

This delayed potential applied to the SCR or first switching means 29 to cause conductivity therethrough causes development of a charge on the capacitor 35 of the first time-constant circuit. Also, a similar negative charge is developed on the capacitor 45 of the second time constant circuit 39 via the resistor 41. Thus, the junction 49 and control electrodes of the FET muting means 15 receive a delayed negative charge which causes a delayed reduction in attenuation and permits signal conductivity in the audio signal channels 9 after any undesired noise due to activation of the energizing switch 23 has been suppressed.

When the energizing switch 23 is de-activated or opened, the capacitor 35 of the first time-constant circuit 31 discharges rapidly through the parallel-connected resistor 33. Thereupon, the potential on the diode 43 is reduced and the capacitor 45 of the second time-constant circuit 39 rapidly discharged. Thus, the negative potential appearing at the junction 49 and control electrodes of the muting means 15 is rapidly reduced whereupon any noise appearing in the audio signal channels due to the energizing switch 23 deactivation is suppressed or attenuated by the muting means 15.

Also, energization of the signal receiver effects closure of the functional switching means 47 which causes a short-circuiting or grounding of the capacitor 45 of the second time-constant circuit 39 and the junction 49. As a result, any noise caused by closure of the functional switching means 47 is attenuated in the audio signal channels 9 by the muting means 15.

Further, attenuation of the audio signal channels 9 is maintained by the muting means 15 for a short period of time after the functional switching means 47 is opened. This delay is effected by the time required to recharge the capacitor 45 of the second time-constant circuit 39 via the relatively large resistor 41. Thus, noise due to operation of the functional switching means 47 is suppressed.

Figure 2:
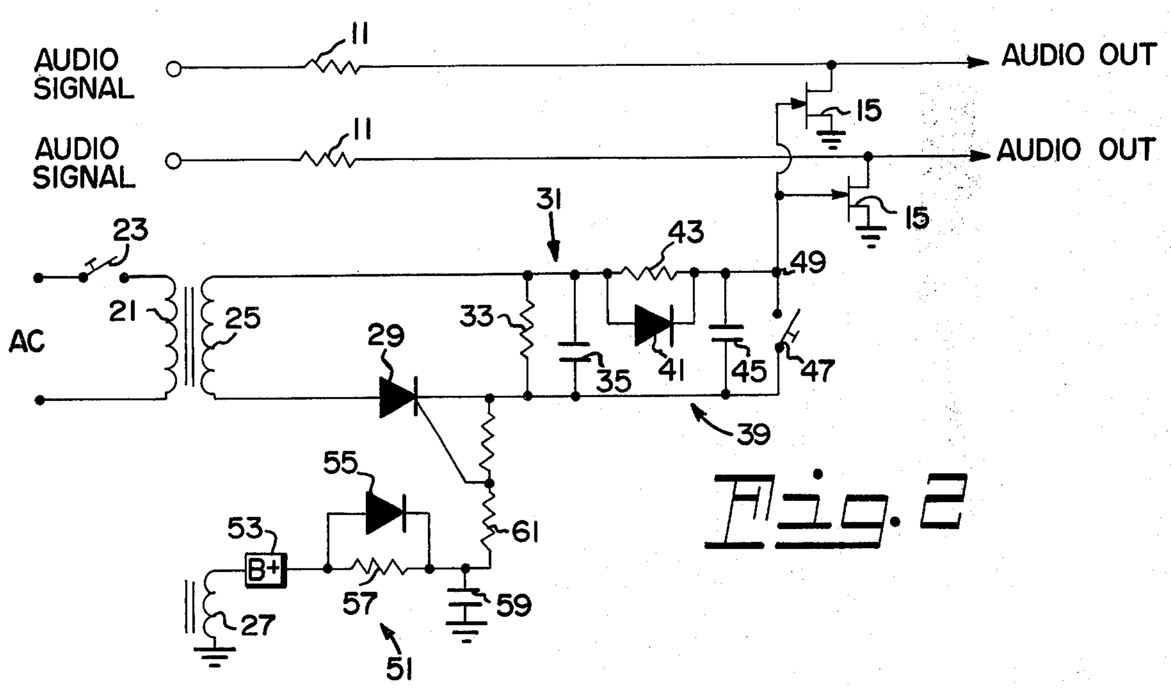
FIG. 2 is an alternate embodiment which includes a specific form of delay.

Alternatively, FIG. 2, employing similar numbers for similar components, includes a delay means 51. This delay means 51 has a DC supply 53 coupled to the second secondary winding 27 and to a parallel-connected diode 55 and resistor 57. In turn, the diode 55 and resistor 57 are coupled to circuit ground by a capacitor 59 and to the control electrode of the SCR or first switching means 29 by a resistor 61.

This delay means 51 operates in a manner somewhat similar to the delay means 37 of FIG. 1. However, the diode 55, resistor 57, and capacitor 59 form a time-constant circuit wherein a delay or finite time is required to effect development of a charge potential on the capacitor 59 upon closure of the energizing switch 23. Also, the diode 55 permits rapid discharge of the capacitor 59 when the system is de-energized.

Figure 3:
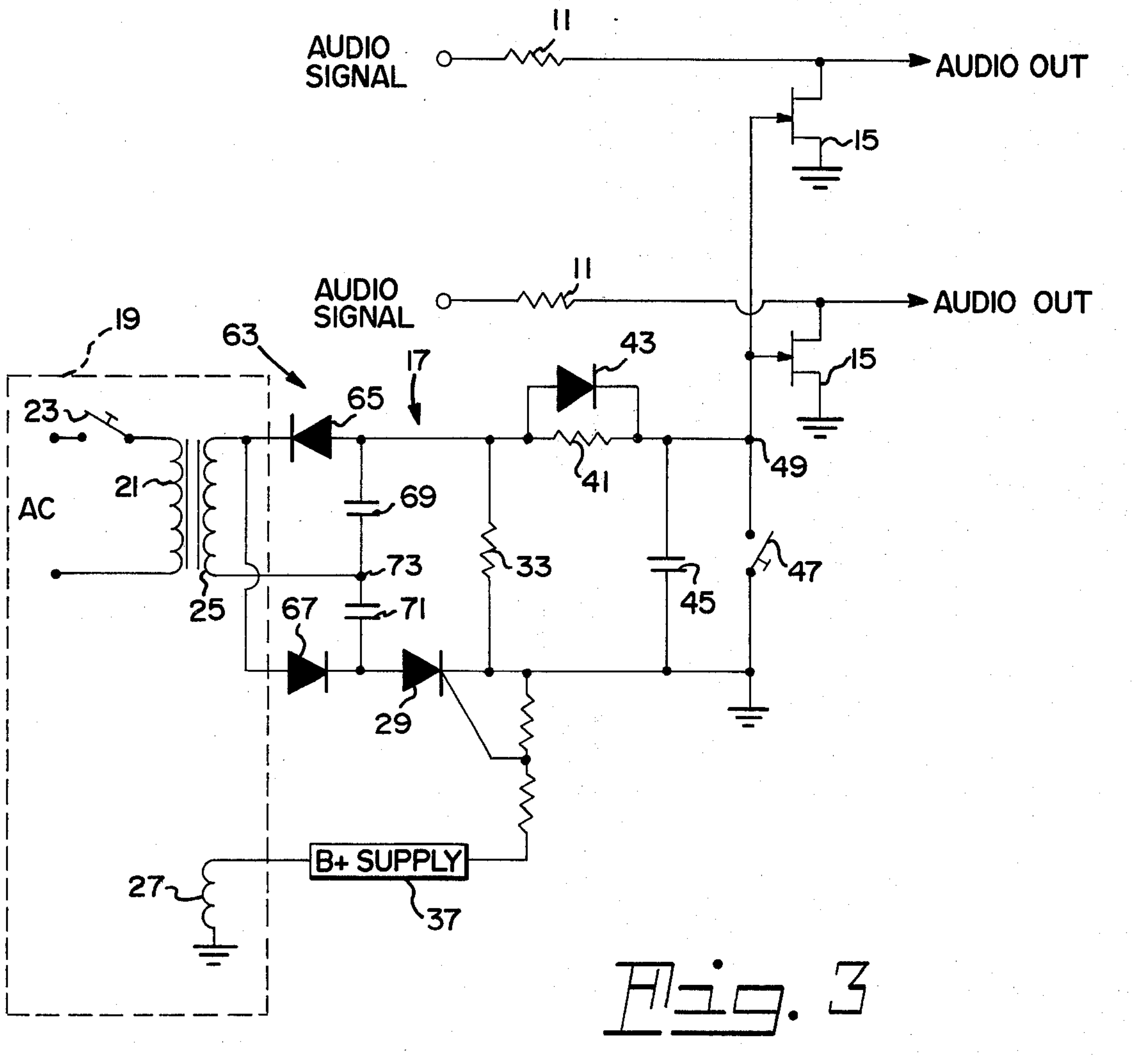
FIG. 3 is still another embodiment of the invention wherein a voltage doubler circuit is employed.

Additionally, FIG. 3 illustrates an alternate embodiment which includes a voltage doubler circuit 63. The voltage doubler circuit 63 includes a pair of oppositely-poled diodes 65 and 67 coupled to the first secondary winding 25 of the switchable potential source 19. Each of the diodes 65 and 67 is coupled to a capacitor, 69 and 71 respectively, which have a common junction 73 coupled to an opposite end of the first secondary winding 25.

Operation of the above-described embodiment is similar to the operations previously described with respect to FIGS. 1 and 2. However, the first switching means or SCR 29 herein does not act as a rectifier but merely as a switch. Moreover, the increased potential due to the voltage doubler action enhances the operational capabilities of the apparatus.

Thus, there has been provided a unique noise suppression circuit suitable for use with a signal receiver. Herein, noise suppression is provided during activation, de-activation, and functional switching of the reciever. Moreover, apparatus is provided for delaying or attenuating the signal channel during the switching operations whereby the desired noise suppression is enhanced.

While there has been shown and described what is at present considered the preferred embodiments of the invention, it will be obvious to those skilled in the art that various modifications and changes may be made therein without departing from the invention as defined by the appended claims.

What is claimed is:

1. In a signal receiver coupled to a switchable potential source and having at least one audio signal channel, a noise suppression circuit comprising:

potential delay means coupled to said switchable potential source;

first switching means coupled to said potential delay means and to said switchable potential source;

first time-constant circuit means coupled to said switchable potential source and to said first switching means;

second time-constant circuit means shunting said first time-constant circuit means and including a series connected capacitor and a resistor shunted by a diode;

second switching means shunting said capacitor of said second time-constant circuit means; and muting means coupled to said series connected resistor and capacitor of said second time-constant circuit means and to said audio signal channel.

2. The noise suppression circuit of claim 1 wherein said potential delay means is in the form of a DC potential source coupled to said switchable potential source.

3. The noise suppression circuit of claim 1 wherein said potential delay means includes a parallel-connected diode and resistor coupling a DC potential source to said switchable potential source and by way of a capacitor to circuit ground.

4. The noise suppression circuit of claim 1 wherein said switchable potential source includes a voltage doubler means having a first diode coupled to a first capacitor and to said first time-constant circuit and a second oppositely-poled diode coupled to a second capacitor connected to said first capacitor and to said first switching means.

5. The noise suppression circuit of claim 1 wherein said first switching means is in the form of a silicon control rectifier (SCR) having a control electrode coupled to said potential delay means.

6. The noise suppression circuit of claim 1 wherein said first time-constant circuit means is in the form of a parallel connected resistor and capacitor.

7. The noise suppression circuit of claim 1 wherein said muting means is in the form of a field effect transistor (FET) connected to said audio signal channel and circuit ground with a control electrode coupled to said resistor and capacitor of said time-constant circuit.

8. A noise suppression circuit for a signal receiver having at least one audio signal channel and a switchable potential source comprising:

means for delaying a potential responsive to said switchable potential source;

means coupled to said switchable potential source and said means for delaying a potential for switching to provide a delayed potential;

means coupled to said delayed potential for effecting a first charged and discharged condition;

means coupled to said first charged and discharged condition;

means for providing a second charged and discharged condition;

means for switching said second charged and discharged condition; and means for muting a signal in said audio signal channel in accordance with the positional location of said means for switching and the charged and discharged condition of said means for providing a second charged and discharged condition.

9. The noise suppression circuit of claim 8 wherein said means for delaying a potential is in the form of a DC potential source.

10. The noise suppression circuit of claim 8 wherein said means for delaying a potential is in the form of a DC potential source coupled by a parallel connected diode and resistor to a capacitor coupled to circuit ground and to said means for switching to provide a delayed potential.

11. The noise suppression circuit of claim 8 wherein said means for effecting first and second charged and discharged conditions are in the form of RC circuit networks.

12. The noise suppression circuit of claim 8 wherein said switchable potential source includes a voltage doubler circuit means.

13. The noise suppression circuit of claim 8 wherein said means for switching said second charge and discharge condition is in the form of a switch shunting a capacitor of said means for providing a second charge and discharge condition.

14. The noise suppression circuit of claim 8 wherein said means for muting a signal in an audio signal channel including a plurality of muting means and audio signal channels.

* * * * *